United States Patent
Lee et al.

(10) Patent No.: US 7,634,076 B2
(45) Date of Patent: Dec. 15, 2009

(54) NETWORK, SYSTEM AND METHOD FOR DISTRIBUTING DIGITAL MEDIA

(75) Inventors: Peter Lee, Chicago, IL (US); William Calderon, Elmwood Park, IL (US)

(73) Assignee: Indicium Media, LLC, Chicago, IL (US)

( * ) Notice: Subject to any disclaimer, the term of this patent is extended or adjusted under 35 U.S.C. 154(b) by 900 days.

(21) Appl. No.: 11/196,612

(22) Filed: Aug. 3, 2005

(65) Prior Publication Data

US 2007/0036303 A1 Feb. 15, 2007

(51) Int. Cl.
*H04M 7/00* (2006.01)

(52) U.S. Cl. .............................. 379/231; 726/5; 713/171

(58) Field of Classification Search ...................... 726/5; 713/201; 379/231
See application file for complete search history.

(56) References Cited

U.S. PATENT DOCUMENTS

| | | | |
|---|---|---|---|
| 5,410,343 A | 4/1995 | Coddington et al. | |
| 5,721,842 A | 2/1998 | Beasley et al. | |
| 6,285,685 B1 | 9/2001 | Bum | |
| 6,438,596 B1 | 8/2002 | Ueno et al. | |
| 6,594,826 B1 | 7/2003 | Rao et al. | |
| 6,681,250 B1 | 1/2004 | Thomas et al. | |
| 6,701,380 B2 | 3/2004 | Schneider et al. | |
| 6,738,983 B1 | 5/2004 | Rao et al. | |
| 2002/0038334 A1* | 3/2002 | Schneider et al. | 709/203 |
| 2002/0087968 A1* | 7/2002 | Krishnan et al. | 725/6 |
| 2002/0095689 A1* | 7/2002 | Novak | 725/151 |
| 2003/0200548 A1 | 10/2003 | Baran et al. | |
| 2004/0031053 A1 | 2/2004 | Lim et al. | |
| 2004/0062305 A1 | 4/2004 | Dambrackas | |
| 2005/0177745 A1* | 8/2005 | Oswald et al. | 713/201 |
| 2006/0015901 A1* | 1/2006 | Safadi et al. | 725/41 |

* cited by examiner

*Primary Examiner*—Quynh H Nguyen
(74) *Attorney, Agent, or Firm*—Patents + TMS, P.C.

(57) ABSTRACT

A network, a system and a method distribute digital media from a substation and/or a server to a set-top box of a subscriber. The digital media is requested, is accessed and/or is transferred from the substation and/or the server to the set-top box via one or more nodes and/or one or more node clusters. The subscriber may utilize an interactive means in conjunction with the set-top box to access, to request, to receive and/or to display the digital media via a communication medium and/or a connection line. One or more nodes and/or one or more node clusters connect a central office to the substation. The digital media is stored in a server farm of the central office which is accessed by one or more nodes and/or one or more node clusters. The digital media is transmitted and/or is distributed to the set-top box via the communication medium, the connection line one or more of the nodes and/or one or more of the node clusters. The subscriber access, displays and/or views the digital media via the set-top box, a display monitor, one or more input devices and/or one or more output devices.

18 Claims, 3 Drawing Sheets

NETWORK, SYSTEM AND METHOD FOR DISTRIBUTING DIGITAL MEDIA

BACKGROUND OF THE INVENTION

The present invention generally relates to a network, a system and a method for distributing digital media. More specifically, the present invention relates to a network, a system and a method for distributing content, digital media and/or a digital file to a subscriber via a remote access to a high-speed network. The network, the system and the method may provide data signals, video signals and/or audio signals from one or more servers to a set-top box of the subscriber via the high-speed network. The set-top box may be connected to a display monitor, one or more input devices and/or one or more output devices. One or more servers may be located at one or more central offices and/or may be in communication with the set-top box. One or more nodes may be connected to one or more computers and/or one or more servers for accessing the content, the digital media and/or the digital file. A substation may connect the set-top box to the one or more nodes. The subscriber may utilize keyboard, video and mouse (hereinafter "KVM") switches over internet protocol (hereinafter "IP") technology to request and/or to access the content, the digital media and/or the digital file from one or more servers via the set-top box and/or one or more nodes. The content, the digital media and/or the digital file may be transmitted from and/or may be distributed from the one or more central offices and/or the one or more nodes to the set-top box via the high-speed network.

It is generally known that a video signal and/or an audio signal may be transmitted from a cable company to a subscriber via a set-top box and/or a network, such as, for example, a coaxial network. The subscriber may access and/or may request the video signal and/or the audio signal via a high-speed connection provided by, for example, a copper line or a digital subscriber line (hereinafter "DSL"). The cable company may provide the video signal and/or the audio signal to the set-top box of the subscriber via the high-speed connection. As a result, the video signal and/or the audio signal may be received by the set-top box which may provide high-definition television (hereinafter "HDTV") and/or video-on-demand to the subscriber. However, the video signal and/or the audio signal may utilize all available bandwidths of the network. As a result, the network may not be capable of providing multiple video signals and/or multiple audio signals to the set-top box of the customer. Therefore, the subscriber may be prevented from requesting and/or from accessing multiple video signals and/or multiple audio signals via the set-top box. Furthermore, the subscriber may be prevented from changing from a first video signal and/or a first audio signal to a second video signal and/or a second audio signal.

Alternatively, the cable company may transmit the video signal and/or the audio signal to the set-top box of the subscriber via a satellite network. The satellite network may allow for transmission of multiple video signals and/or multiple audio signals. However, the subscriber may not be capable to request the video signal and/or the audio signal from the cable company via the satellite network. Moreover, the subscriber may not interact with the satellite network. As a result, the satellite network may prohibit the subscriber from interacting with the cable company to request and/or to request and/or to access the video signal and/or the audio signal as desired by the subscriber.

Moreover, the high-speed connection and/or the satellite network may not be secured during the transmission of the video signal and/or the audio signal from the cable company to the set-top box. The video signal and/or the audio signal may be pirated, may be accessed and/or may be received by a non-subscriber via the high-speed connection and/or the satellite network. As a result, a non-subscriber may access and/or may receive the video signal and/or the audio signal without having to pay and/or to be a subscriber of the cable company.

A need, therefore, exists for a network, a system and a method for distributing digital media to subscriber. Additionally, a need exists for a network, a system and a method for distributing the content, the digital media and/or the digital file which may provide one or more data signals, one or more video signals and/or one or more audio signals to a subscriber without utilizing all available bandwidths of a high-speed connection. Further, a need exists for a network, a system and a method for distributing digital media which may allow a subscriber to request, to access and/or to receive the content, the digital media and/or the digital file via one or more nodes and/or a high-speed connection. Still further, a need exists for a network, a system and a method for distributing digital media which may be requested and/or may be accessed by the subscriber via a set-top box and/or one or more KVM switches from one or more servers. Moreover, a need exists for a network, a system and a method for distributing digital media which may provide one or more central offices, one or more substations, one or more nodes, one or more servers and/or one or more computers to store and/or to distribute the digital media. Furthermore, a need exists for a network, a system and a method for distributing digital media which may provide HDTV and/or VOD to a subscriber via a set-top box, one or more KVM switches and a high-speed connection.

SUMMARY OF THE INVENTION

The present invention relates to network, a system and a method for distributing digital media to a subscriber which may utilize an interactive means to provide an on-demand service to the subscriber. One or more central offices may be connected to one or more substations which may be connected to nodes and/or node clusters at each of the one or more substations. Each of the nodes and/or each of the node clusters may send and/or may receive digital media, such as, for example, a data signal, a digital audio signal and/or a digital video signal. The digital media from each of the one or more nodes may be transmitted and/or distributed to a set-top box of the subscriber via a communication medium, such as, for example, a high-speed connection and/or a connection line. The set-top box may emulate and/or may display the digial media from the node via, for example, a display monitor, a television, one or more data input devices and/or one or more data output devices. The subscriber may control the node remotely and/or may query requests of the digital media via the set-top box, a handheld device and/or the one or more data input devices. Each of the one or more nodes may be connected to a plurality of servers locally at the substation and/or remotely at another substations, at another central office via an internet protocol network and/or at a global headquarters. Each of the nodes and/or each of the node clusters may access and/or may be in communication with one or more servers at one or more central offices via a high speed closed network.

To this end, in an embodiment of the present invention, a network for distributing digital media to a set-top box of a user via internet protocol is provided. The system has a central office having a first server and a keyboard video mouse switch wherein the keyboard video mouse switch is connected to the first server and further wherein the digital media is stored in the first server. Further, the system has a substation having a switch and a multiplexer wherein the substation is remote with respect to the set-top box and the central office and further wherein the switch is connected to the multiplexer. Moreover, the system has a node connecting the substation to the central office wherein the node accesses the digital media in the first server via the keyboard video mouse switch wherein the digital media is transferred to the substation and further wherein the substation transmits the digital media to the set-top box of the user.

In an embodiment, the network has a line connecting the multiplexer of the substation to the set-top box of the user.

In an embodiment, the network has an internet service provider connected to the substation.

In an embodiment, the network has a voice over internet protocol network connected to the substation.

In an embodiment, the network has a fiber optic line connecting the switch of the substation to the central office.

In an embodiment, the network has a second server controlling the keyboard video mouse switch.

In an embodiment, the network has a second server controlling the keyboard video mouse switch.

In another embodiment of the present invention, a system for distributing digital media to a user via an internet protocol is provided. The system has a set-top box having a graphical user interface and a display monitor wherein the digital media is requested via graphical user interface and further wherein the digital media is displayed via the display monitor. Further, the system has a first network of servers having a keyboard video mouse switch wherein the digital media is stored in the first network of servers. Still further, the system has a substation connecting the set-top box to the first network of servers wherein the substation is remote with respect to the set-top box and the first network of servers wherein a node of the substation is connected to the keyboard video mouse switch of the first network of servers wherein the digital media is transferred from the first network of servers to the substation via the node. Moreover, the system has a connection line connecting the substation to the set-top box wherein the digital media is transferred to the set-top box via the connection line.

In an embodiment, the graphical user interface is a wireless device.

In an embodiment, the system has a swipe card reader in communication with the set-top box.

In an embodiment, the system has a second network of servers in communication with the substation or the first network of servers.

In an embodiment, the system has a smart card for accessing the digital media via the set-top box.

In an embodiment, the system has a satellite in communication with the first network of servers.

In an embodiment, the system has a fiber optic link connecting the substation to the first network of servers.

In another embodiment of the present invention, a method for distributing digital media to a set-top box of a user wherein the set-top box has a graphical user interface is provided. The method has the step of providing a network having a substation and a plurality of servers wherein the substation is remote with respect to the set-top box and the plurality of servers wherein a node of the substation is connected to a keyboard video mouse switch of the plurality of servers via a fiber optic link wherein the digital media is stored in the plurality of servers. Further, the method has the step of accessing the digital media in the plurality of servers with the node via the keyboard video mouse switch wherein the digital media is transferred to the substation via the fiber optic link. Moreover, the method has the step of transferring the digital media from substation to the set-top box wherein the set-top box disseminates the digital media.

In an embodiment, the method has the step of requesting the digital media from the substation via the graphical user interface.

In an embodiment, the method has the step of transferring an advertisement from the plurality of servers to the set-top box.

In an embodiment, the method has the step of authorizing the digital media to be transferred to set-top box.

In an embodiment, the method has the step of storing the digital media in the set-top box.

In an embodiment, the method has the step of collecting marketing data from the set-top box.

It is, therefore, an advantage of the present invention to provide a network, a system and a method for distributing digital media which may utilize a communication medium, a substation, a connection line and/or a set-top box to distribute the digital media to a subscriber.

Another advantage of the present invention is to provide a network, a system and a method for distributing digital media which may have an on-demand means for a subscriber to remotely request and/or to remotely access the digital media and/or software.

And, another advantage of the present invention is to provide a network, a system and a method for distributing digital media which may utilize a keyboard video mouse (KVM) switch to remotely request and/or to remotely access the digital media.

Yet another advantage of the present invention is to provide a network, a system and a method for distributing digital media which may store content and/or a digital file relating to the digital media in a server or a computer of a server farm at a central office.

A further advantage of the present invention is to provide a network, a system and a method for distributing digital media which may utilize a communication medium to transmit the digital media from a central office, a server and/or a computer to a set-top box of a subscriber.

Moreover, an advantage of the present invention is to provide a network, a system and a method for distributing digital media which may be a closed network to prevent piracy and/or to prevent theft of the digital media by a non-subscriber.

And, another advantage of the present invention is to provide a network, a system and a method for distributing digital media which may utilize a node and/or a node cluster to transmit a digital video feed, a digital audio feed and/or a digital data feed from a central office to set-top box of a subscriber.

Yet, another advantage of the present invention is to provide a network, a system and a method for distributing digital media which may have one or more substations connecting a central office and/or a global headquarters to a set-top box of a subscriber.

Another advantage of the present invention is to provide a network, a system and a method for distributing digital media which may display and/or may emulate the digital media, content and/or a digital file via a high-definition television (HDTV) monitor, one or more input devices and/or one or more output devices.

Yet another advantage of the present invention is to provide a network, a system and a method for distributing digital media which may have a node and/or a node cluster to send, to access, to transfer and/or to receive the digital media.

A still further advantage of the present invention is to provide a network, a system and a method for distributing digital media which may transmit a single digital video feed and/or a single digital audio feed from a server and/or a substation to a set-top box of a subscriber.

Moreover, an advantage of the present invention is to provide a network, a system and a method for distributing digital media which may transmit one or more digital video feeds and/or one or more digital audio feeds from a global headquarters, a central office, a server, a computer and/or a database to a computer and/or a server at a substation via a node and/or a node cluster.

And, another advantage of the present invention is to provide a network, a system and a method for distributing digital media which may transmit the digital media from a central office to a substation via a fiber optic link.

Yet another advantage of the present invention is to provide a network, a system and a method for distributing digital media which may transmit the digital media from a substation and/or a server to a set-top box via a telephone line, a digital subscriber line, a symmetric digital subscriber line and/or an asymmetric digital subscriber line A further advantage of the present invention is to provide a network, a system and a method for distributing digital media which may utilize a set-top box, a smart card, a remote device and/or a HDTV monitor to access, to display and/or to emulate the digital media.

Moreover, an advantage of the present invention is to provide a network, a system and a method for distributing digital media which may allow a subscriber to interact with a substation and/or a server with a set-top box of the subscriber.

A still further advantage of the present invention is to provide a network, a system and a method for distributing digital media which may utilize a high-speed switch to connect a set-top box of a subscriber with a node and/or a node cluster of a central office.

Yet another advantage of the present invention is to provide a network, a system and a method for distributing digital media which may provide advertisement content to and/or may track marketing data from a set-top box of a subscriber.

A still further advantage of the present invention is to provide a network, a system and a method for distributing digital media which may provide digital media relating to a motion picture, a musical performance, a sporting event, an educational lecture, a video game or a multi-player game.

Moreover, an advantage of the present invention is to provide a network, a system and a method for distributing digital media which may allow a subscriber to create a hard copy of the digital media.

Additional features and advantages of the present invention are described in, and will be apparent from, the detailed description of the presently preferred embodiments and from the drawings.

DETAILED DESCRIPTION OF THE PREFERRED EMBODIMENTS

A network, a system and a method for distributing digital media may provide the digital media to a subscriber via a communication medium, a set-top box and/or a substation. A central office may be connected to a substation which may be connected to the set-top box of the subscriber. A plurality of nodes of the substation may connect the substation and/or the set-top box with the central office. Each of the plurality of nodes may send and may receive data signals, digital audio signals and/or digital video signals from the central office and/or the substation to the set-top box. Each of the plurality of nodes may access the one or more servers from a server farm of the central office. The digital media may be stored on servers and/or may be secured by the closed network. The set-top box may display and/or may emulate the one of the plurality of nodes via a monitor, a television, one or more data input devices and/or one or more output devices. As a result, the subscriber may remotely control and/or may remotely query requests for the digital media from substations and/or each of the plurality of nodes via one or more input devices.

Figure 1:
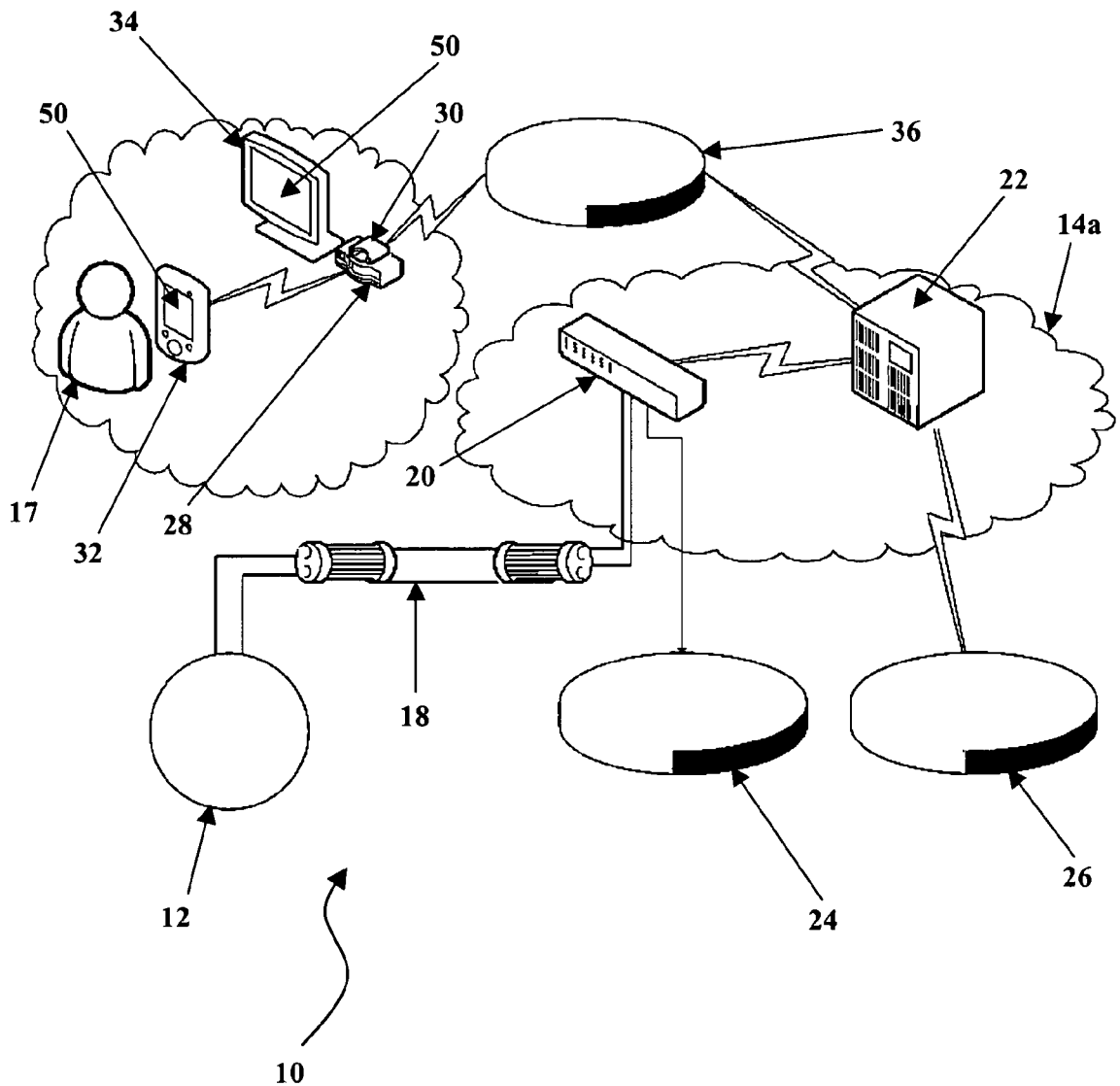
FIG. 1 is a diagram of a first level network in an embodiment of the present invention.

Referring now to the drawings wherein like numerals refer to like parts, FIG. 1 illustrates a network 10 which may include a central office 12, a substation 14a and/or premises 16 of a subscriber 17. The central office 12 may be connected to, may be attached to and/or may be in communication with the substation 14a via a communication medium 18. The communication medium 18 may be a high-speed connection, such as, for example, a fiber optic link and/or the like. Alternatively, the central office 12 may be wirelessly connected to the substation 14. The present invention should not be deemed as limited to the embodiments of a specific high-speed connection of the communication medium 18.

The substation 14a may have a virtual local-area network switch 20 (hereinafter "VLAN switch 20") and/or a digital subscriber line access multiplexer 22 (hereinafter "DSLAM 22"). The VLAN switch 20 may be connected to, may be attached to and/or may be in communication with the DSLAM 22. An internet service provider 24 (hereinafter "ISP 24") may be connected to, may be attached to and/or may be in communication with the VLAN switch 20 of the substation 14a. As a result, the ISP 24 may be connected to and/or in communication with the DSLAM 22. The ISP 24 may provide a network backbone for the substation 14a. A voice over internet protocol (hereinafter "VOIP") 26 may be connected to, may be attached to and/or may be in communication with the DSLAM 22. As a result, the VOIP 26 may be connected to and/or may be in communication with the VLAN switch 20 of the substation 14a. The VOIP 26 may be, for example, a telephone system.

As illustrated in FIG. 1, the premises 16 of the subscriber 17 may have a set-top box 28, an authentication device 30, a handheld device 32 and/or a display monitor 34. The authentication device 30 and/or the display monitor 34 may be connected to, may be attached to and/or may be in communication with the set-top box 28. The handheld device may be, for example, a wireless control device which may produce a signal for communication with the set-top box 28. As a result, the subscriber 17 may activate, may control and/or may deactivate the set-top box 28 and/or the display monitor 34 via the handheld device 32. The authentication device 30 may require an identification of the subscriber 17 to determine whether the subscriber 17 may activate, may control and/or may deactivate the set-top box 28. The identification of the subscriber 17 may be stored in an authentication server 212 as illustrated in FIG. 2.

The set-top box 28 may be connected to, may be attached to and/or may be in communication with the DSLAM 22 of the substation 14a via a connection line 36. As a result, the set-top box 28 may be connected to and/or may be in communication with the substation 14a via the connection line 36. The connection line 36 may be, for example, a telephone line, a digital subscriber line (hereinafter "DSL"), a symmetric digital subscriber line (hereinafter "SDSL"), a asymmetric digital subscriber line (hereinafter "ADSL"), a high-data-rate DSL (hereinafter "HDSL"), a very-high DSL (hereinafter "VDSL") and/or the like. Alternatively, the connection line 36 may be a wireless connection between the substation 14a to the set-top box 28. The present invention should not be deemed as limited to the embodiments of a specific connection line 36.

Figure 2:
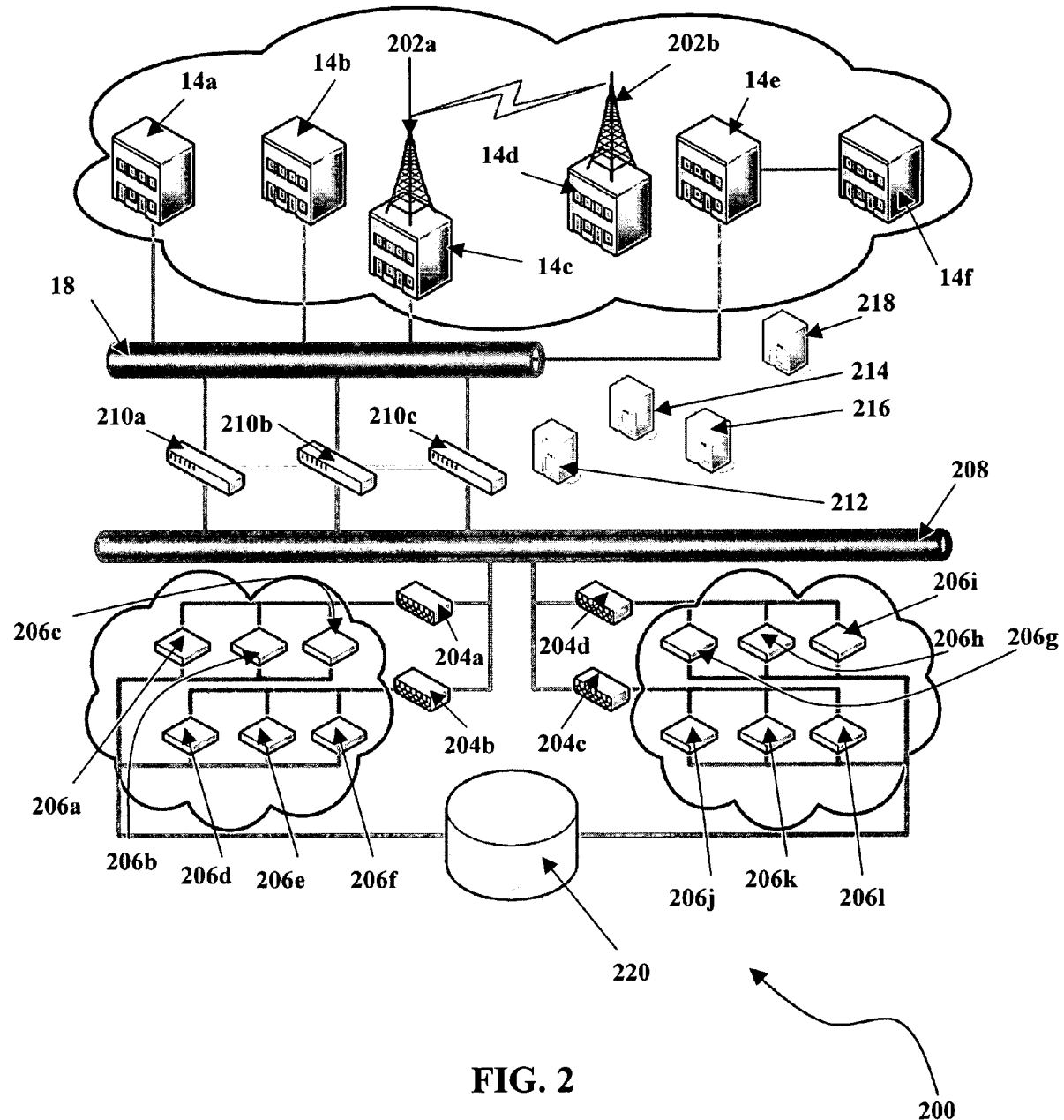
FIG. 2 is a diagram of a second level network in an embodiment of the present invention.

FIG. 2 illustrates a second level network 200 in an embodiment of the present invention. The network 200 may have substations 14a-14f which may be connected to the central office 12 via the communication medium 18. One of the substations 14a-14f may be connected to, may access and/or may communicate with another one of the substations 14a-14f via antennas 202a, 202b. The antennas 202a, 202b may transmit and/or may receive a signal, such as, for example, a microwave signal. For example, the substation 14c may have the antenna 202a attached thereon which may communicate with the substation 14d via the antenna 202b attached to the substation 14d. As a result, the substation 14c may be connected to, may access and/or may communicate with the substation 14d via a signal transmitted between the antenna 202a and the antenna 202b. Alternatively, one of the substations 14a-14f may be connected to and/or in communication with another one of the substations 14a-14f via a daisy chain. For example, the substation 14e may be connected to, may communicate with and/or may be daisy-chained to the substation 14f via the communication medium 18 as illustrated in FIG. 2. It should be understood that the network 200 may have any number of substations 14a as implemented by one having ordinary skill in the art. The present invention should not be deemed as limited to the embodiments of a specific signal connecting one or more of the substations 14a-14f.

As illustrated in FIG. 2, the central office 12 may have and/or may be defined by high-speed switches 210a-210c, an authentication server 212, a network management server 214, a set-top management server 216, a KVM management 218, a network backbone 208, KVM switches 204a-204d, node clusters 206a-206l and/or a server farm 220. The network management server 214 may manage, may access, may control and/or may update the network 200. The KVM management server 218 may manage, may control, may activate and/or may deactivate one or more of the KVM switches 204a-204d.

The substations 14a-14f may be connected to the network backbone 208 via the communication medium 18 and/or the high-speed switches 210a-210c. The network backbone 208 may be attached to and may be connected to the authentication server 212, the network management server 214, the set-top management server 216 and/or the KVM management server 218. As a result, the set-top box 28 and/or one or more of the substations 14a-14f may be connected to, may access and/or in communication with the authentication server 212, the network management server 214, the set-top management server 216 and/or the KVM management server 218 via the communication medium 18 and/or one or more of the high-speed switches 210a-210c. It should be understood that the network 200 may have any number of high-speed switches 210 as implemented by one having ordinary skill in the art. The present invention should not be deemed as limited to the embodiments of specific high-speed switches 210a-210c of the network 200.

The digital media may have content and/or a digital file. The content, the digital media and/or the digital file may be an electronic file in a digital format and/or an electronic file which may be transferred to the digital format. The content, the digital media and/or the digital file may be a motion picture, a TV episode, a sporting event, a documentary and/or the like. The content, the digital media and/or the digital file may be within a digital library which may be stored in and/or may be accessed from the server farm 220. The subscriber 17 may request, may access, may view and/or may display the digital library, the content, the digital media and/or the digital file. Rights to store the content, the digital media and/or the digital file in the server farm 220 of the central office 12 may be negotiated with, for example, a studio, a production house and/or the like. The content, the digital media and/or the digital file may be, for example, a local news broadcast, a public broadcast, a local documentary and/or a local sporting event or entertainment event from the cable television station and/or the television station. It should be understood that the digital format of the content, the digital media and/or the digital file may be any digital format known to one having ordinary skill in the art. The present invention should not be deemed as limited to the embodiments of a specific content, a specific digital media and/or a specific digital file of the network 10.

The network backbone 208 may be connected to the node clusters 206a-206l via one or more of the KVM switches 204a-204d. As a result, the set-top box 28 and/or one or more of the substations 14a-14f may be connected to and/or may be in communication with one or more of the node clusters 206a-206l via the communication medium 18, one or more of the high-speed switches 210a-210c and/or one or more of the KVM switches 204a-204d. It should be understood that the network 200 may have any number of KVM switches 204 and/or any number of node clusters as implemented by one having ordinary skill in the art.

One or more of the node clusters 206-206l may be connected to, may be attached to and/or may be in communication with the server farm 220 of the central office as illustrated in FIG. 2. As a result, the set-top box 28 and/or one or more of the substations 14a-14f may be connected to and/or may be in communication with the server farm 220 via the communication medium 18, one or more of the high-speed switches 210a-210c, one or more of the KVM switches 204a-204d and/or one or more of node clusters 206a-206l. It should be understood that the network 10 may have any number of central offices 12 and/or that the network 200 may have any number of server farms 220 as implemented by one having ordinary skill in the art.

Figure 3:
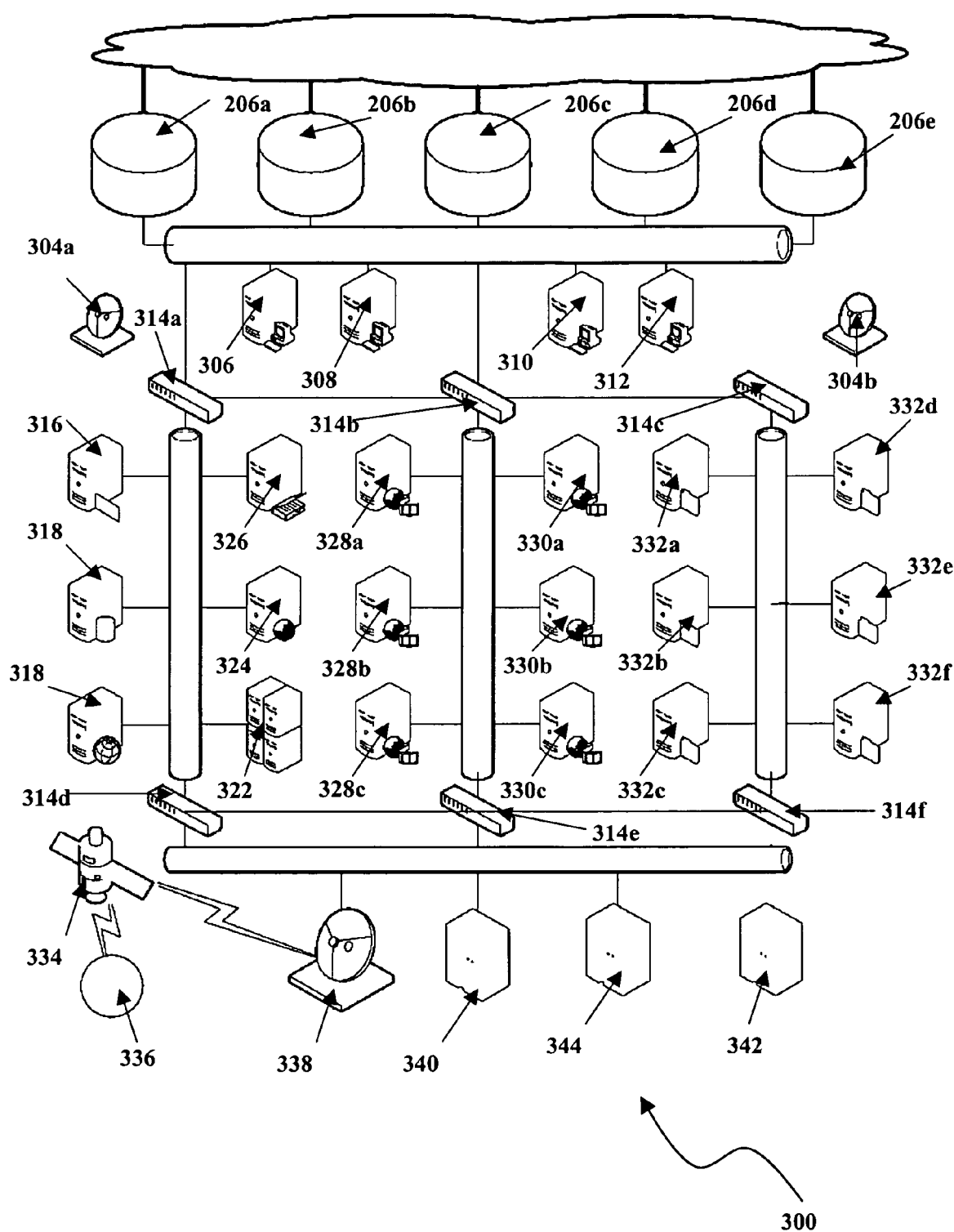
FIG. 3 is a diagram of a network of a server farm of the second level network of FIG. 2 in an embodiment of the present invention.

FIG. 3 illustrates a network 300 of the server farm 220 of the second level network 200 of FIG. 2 in an embodiment of the present invention. The node clusters 206a-206e may be attached to, may be connected to, may access and/or may be in communication with the network 300 of the server farm 220. One or more of the node clusters 206a-206e may be connected to, may be attached to and/or may be in communication with internal cable access television (hereinafter "CATV") systems 304a, 304b. One or more of the node clusters 206a-206e may be connected to, may be attached to, may access and/or may be in communication with a domain controller 306, a dynamic host configuration protocol (hereinafter "DHCP") server 308, a domain name system (hereinafter "DNS") server 310 and/or a network management server 312.

One or more of the node clusters 206a-206e may be connected to and/or may be attached to high-speed switches 314a-314f. One or more of the high-speed switches 314a-314f may be connected to and/or may be attached to a subscriber database 340, a marketing database 344, a content rating database 342 and/or a central office uplink 338. The central office uplink 338 may be connected to and/or in communication with a global headquarters 336 via a satellite 334 as illustrated in FIG. 3. As a result, one or more of the node clusters 206a-206e may be connected to and/or may be in communication with the subscriber database 340, the marketing database 344, the content rating database 342, the central office uplink 338 and/or the global headquarters 336. It should be understood that the network 300 may have any number of high-speed switches 314 as implemented by one having ordinary skill in the art.

One or more of the node clusters 206a-206e may be connected to, may access and/or may communicate with an exchange messenger server 316, a content database 318, and/or a graphical user interface (hereinafter "GUI") content management server 320 via one or more of the high-speed switches 314a-314f. Further, one or more of the node clusters 206a-206e may be connected to, may access and/or may be in communication with an application server 322, a GUI content server 324 and/or a directory server 326 via one or more of the high-speed switches 314a-314f. Still further, one or more of the node clusters 206a-206e may be connected to, may access and/or may be in communication with streaming video content servers 328a-328c, advertisement content servers 330a-330c and/or content servers 332a-332f via one or more of the high-speed switches 314a-314f. It should be understood that the network 300 may have any number of streaming video content servers 328, any number of advertisement content servers 330 and/or any number of content servers 332 as implemented by one having ordinary skill in the art.

The set-top box 28 may receive and/or may display the content, the digital media and/or the digital file via a first channel and/or a second channel from the substations 14a. The first channel may be, for example, a broadband connection. The first channel may have a video signal and/or an audio signal from substation 14a. The video signal may be tuned to a resolution depending on the display monitor 34. The audio signal may be, for example, a compressed audio stream. The second channel may allow set-top box 28 to send data to, to receive data from and/or to communicate data with the substation 14a. The subscriber 17 may be capable of interacting with and/or may be capable of communicating with the substation 14a via the second channel, the handheld device 32, the set-top box 28 and/or the connection line 36. The subscriber 17 may utilize the authentication device 30 to be authenticated and/or to be identified by the network 10 via the authentication server 212. After authentication and/or identification, the network 10 may allow the subscriber 17 to communicate with the substation 14a, the central office 12 and/or the global headquarters 336. Moreover, the set-top box 28 and/or the handheld device 32 may be a keyboard video mouse (hereinafter "KVM") switch. The set-top box 28 and/or the handheld device 32 may remotely control the substation 14a to access the digital media of the central office 12 via connection line 36 and the communication medium 18, respectively. The subscriber 17 may be authenticated to communicate with the substation 14a via the authentication device 30, the handheld device 32, the communication medium 18, the connection line 36 and/or the authentication server 212.

The authentication device 30 may have a swipe card reader (not shown in the drawings) thereon for reading, for example, a smart card (not shown in the drawings) and/or a credit card (not shown in the drawings). The smart card may authorize the subscriber to activate, to control and/or to deactivate the handheld device 32 and/or the set top-box 28. The credit card may allow the subscriber and/or a third party to purchase the digital media via the network 10.

Alternatively, the handheld device 32 may have the swipe card reader thereon for reading, for example, the smart card and/or the credit card. The handheld device 32 may be in communication with the authentication server 212 and/or the subscriber database 340 of the central office 12 to authenticate and/or to identify the subscriber 17. As a result, the smart card may authorize the subscriber 17 to activate, to control and/or to deactivate the handheld device 32 and/or the set top-box 28. The credit card may allow the subscriber 17 and/or the third party to purchase the digital media via the network 10. The handheld device 32 may be powered by a battery, such as, for example, a replaceable battery or a rechargeable battery.

The set-top box 28 may disseminate and/or may display, the digital media, the content, the digital file, the data signal, the audio signal and/or the video signal via the display monitor 34. The set-top box 28 may provide a conduit for accessing the server farm 220 of the central office 12. The set-top box 28 may be controlled by the handheld device 32 via, for example, infrared light, ultraviolet light and/or the like. Alternatively, the handheld device 32 may be a personal digital assistant (hereinafter "PDA"). In another embodiment, the handheld device 32 may be, for example, a standard pointing device which may have a touch liquid crystal display (hereinafter "LCD")and/or a keyboard. The subscriber 17 may control and/or may access the set-top box 28 via the LCD and/or the keyboard.

The subscriber 17 may deactivate the handheld device 32 and may connect the handheld device 32 to the set-top box 28 via a data cord (not shown in the drawings) or by partially inserting the handheld device 32 into an opening (not shown in the drawings) of the set-top box 28. The set-top box 28 may charge the rechargeable battery of the handheld device. Further, the set-top box 28 may update firmware and/or may update software on the handheld device 32 via the set-top management server 216 of the central office 12.

The set-top box 28 may download and/or may transfer an advertisement to the handheld device 32 which may be stored into the handheld device 32 for viewing by the subscriber 17. The advertisement may be, for example, a still advertisement or a semi-graphical advertisement which may be stored in and/or may be accessed from one or more of the advertisement content servers 330a-330c. The LCD of the handheld device 32 may have a screen saver which may be displayed when the handheld device 32 is not in use and/or has been deactivated. Moreover, the screen saver may be the advertisement from one or more of the advertisement content servers 330a-330c.

The swipe card reader of the set-top box 28 and/or the handheld device 32 and/or the smart card may be implemented as a security measure to prevent unauthorized access to the network 10 by a non-subscriber and/or the like. The swipe card reader may allow for user portability and/or an ability to securely sign-on and/or to login from a set-top box 28 at another location with the smart card. The authentication device 30 may be in communication with the authentication server 212 and/or the subscriber database 340 of the central office 12 to authenticate and/or to identify the subscriber 17. As a result, the subscriber 17 may access the content, digital media and/or the digital file which may have been purchased by the subscriber 17 from the substation 14a and/ or the central office 12. However, the subscriber 17 may not be logged into the network 10 more than once at a given time. Moreover, the smart card may be customized to content based on preferences and an age of the subscriber. The smart card may have a parental control means therein which may be in communication with and/or may be controlled by the subscriber database 340 and/or the content rating database 342 of the central office 12. The content rating database 342 and/or subscriber database may authorize the subscriber 17 to access the content, the digital media and/or the digital file based upon the identification of the subscriber 17.

For the video signal, the set-top box 28 may have a standard video connector, a digital visual interface (hereinafter "DVI") connector and/or high definition connectors. For the audio signal, the set-top box 28 may have a standard left audio plug and/or a standard right audio plug, and/or a digital audio connector for connection to a home theater (not shown in the drawings). The set-top box 28 may have a pass-thru to connect a digital video disc (hereinafter "DVD") player to the set-top box 28. The set-top 28 may be programmed by the subscriber 17 or the set-top management server 216 to communicate with the display monitor 34 and/or the home theater as illustrated in FIG. 2. As a result, the content, the digital media and/or the digital file received by the set-top box 28 may be directed to the proper audio connectors and/or the proper video connectors which correspond to a resolution of the display monitor 34 and/or an audio format of the home theater, respectively. The subscriber 17 may configure the set-top box 28 based on the display monitor 34 and/or the home theater via the handheld device 32.

The set-top box 28 may connect to a computer (not shown in the drawings) or a router (not shown in the drawings) at the facility 16 of the subscriber 17 to access a network, such as, for example, an internet, an intranet, a local-area network and/or a wide-area network via the ISP 24 and/or the VOIP 26. However, the content, the digital media and/or the digital file received by the set-top box 28 may not be accessed and/or may not be transmitted through the network via the ISP 24 and/or the VOIP 26.

Alternatively, the set-top box 28 may be a remote computer (not shown in the drawings). The remote computer may have an ADSL modem or a DSL modem, a standard video port, a keyboard port and/or a mouse port to facilitate connection to a computer monitor, a keyboard and/or a mouse, respectively. As a result, the remote computer may provide a secured computer and/or a secured network for an entity, such as, for example, a government entity, a healthcare provider and/or the like.

The subscriber 17 may be required to insert the smart card into swipe card reader on the handheld device 32 and/or the authentication device 30 of the set-top box 28 to identify the subscriber 17 and/or to activate the handheld device 32 and/or the set-top box 28, respectively. After the subscriber 17 has been authenticated and/or has been identified by the handheld device 32 and/or the set-top box 28, the set-top box 28 may display a main screen 50 to the subscriber 17 via the display monitor 34 and/or the handheld device 32. The main screen 50 may have a search option which may allow the subscriber 17 to search for the content, the digital media and/or the digital file which may be stored within one of the substations 14a-14f and/or the server farm 220 of the central office 12. The directory server 326, the network management server 312 and/or the content database 318 may manage and/or may summarize the content, the digital media and/or the digital file which may be stored in the server farm 220.

Via the directory server 326, the network management server 312 and/or the content database 318, the main screen 50 may have a browse option which may allow the subscriber 17 to browse the content, the digital media and/or the digital file by a trait, such as, for example, a genre, an actor, a performer, a type of media, a year of production or price of purchase and/or the like. The main screen 50 may have a live option which may allow the subscriber 17 to view and/or to receive a channel which may be broadcasted by the cable television station via the display monitor 34 and/or the handheld device 32. The main screen may have a local option which may allow the subscriber 17 to receive and/or to view a channel which may be broadcasted by a local-area television station, a regional-area television station, a national television station and/or an international television station via the display monitor 34 and/or the handheld device 32. The main screen may have a music option which may allow the subscriber 17 to access and/or to listen to a channel which may be broadcasted in radio station format and/or the like. The present invention should not be deemed as limited to the embodiments of a specific trait of the browse option of the main screen.

The subscriber 17 may locate the content, the digital media and/or the digital file via the display monitor 34 and/or the handheld device 32 or the set-top box 28 as illustrated in FIG. 1. The subscriber may utilize the handheld device or the set-top box 28 to select the content, the digital media and/or the digital file as displayed on the display monitor 34 and/or the handheld device 32. The subscriber 17 may view information relating to and/or associated with the content, the digital media and/or the digital file via the display monitor 34 and/or the handheld device 32. The information may provide, for example, a title, a year of production, a cost of purchase, a digital format, a size of a file and/or the like. The subscriber 17 may utilize the handheld device 32 and/or the set-top box 28 to launch, to access and/or to view the content, the digital media and/or the digital file via the display monitor 34 and/or the handheld device 32.

The digital media may have been launched and/or an advertisement may be transmitted from one of the advertisement content servers 330a-330b of the central office 12 to the set-top box 28. The advertisement may be viewed and/or may be displayed via the display monitor 34 and/or the handheld device 12 prior to displaying and/or to launching the content, the digital media and/or the digital file. The advertisement may be based on, may be depend upon and/or may relate to the content, the digital media and/or the digital file. The subscriber 17 may not be capable and/or may not be permitted to forward past, to omit and/or to skip the advertisement.

After the content, the digital media and/or the digital file may been received by the set-top box 28, the set-top box 28 may be displayed and/or may be view continuously and/or without interruptions via the display monitor 34. The subscriber 17 may fast-forward, may pause, and/or may rewind the content, the digital media and/or the digital file via the handheld device 32 and/or the set-top box 28. The content, the digital media and/or the digital file of the cable television station and/or the television station may be recorded and/or may be stored via a digital capture device (not shown in the drawings). The digital capture device may be integrated into the set-top box 28 and/or into one or more of the substations 14a-14f. The subscriber may utilize, may access and/or may control the digital capture device via the handheld device 32 and/or the set-top box 28. As a result, the subscriber 17 may store, may fast-forward, may pause and/or may rewind the content, the digital media and/or the digital file from the cable television station and/or the television station.

Since the content, the digital media and/or the digital file may be stored within the set-top box 28, a graphical user interface (hereinafter "GUI") and/or an amount of digital media stored in the set-top box 28 may not be limited by the network 10. The GUI may be managed, may be controlled, may be updated and/or may be accessed by the GUI content management server 320 and/or the GUI content server 324 of the central office 12 as illustrated in FIGS. 1 and 3. The display monitor 34 and/or the set-top box may display the GUI which may include, for example, a picture-in-picture feature. For a channel from the cable television station and/or television station, the picture-in-picture feature may be a scrolling bar displaying, for example, a time of show and/or a miniature display of one or more channels from the cable television station and/or television station.

The GUI may be a computer program application which may be stored in the application server 322 of the central office 12. The GUI may be customized and/or may be configured for and/or by the subscriber 17. The computer program application may transmit a compressed digital video signal and/or a compress digital data signal to the set-top box 28. The handheld device 32 and/or the set-top box 28 may transmit input signals for the computer program application to the central office 12 and/or one or more of the substations 14a-14f via the connection line 36 and/or the communication medium 18.

A CATV tuner of the internal CATV system 304 may be utilized by the computer program application of the GUI for the content, the digital media and/or the digital file which may relate to the cable television station and/or the television station. The CATV tuner may be able to tune one or more frequencies and may provide one or more live feeds of digital media from one or more cable television stations and/or one or more television stations to the set-top box 28. The subscriber 17 may utilize the handheld device 28 and/or the set-top box 28 to order on-demand programming which may include the content, the digital media and/or the digital file. As a result, the network 10 may deliver the on-demand programming via, for example, a gigabit closed network to the substation 14a and/or the set-top box 28 from the server farm 220 of the central office 12. As a result, the subscriber 17 may have a gigabit connection for delivery of the on-demand programming to the set-top box 28 without requiring a fiber optic connection between the set-top box 28 and one or more substations 14a-14f.

The subscriber 17 may select, may access, may launch, may view, may purchase and/or may display the content, the digital media and/or the digital file relating to, for example, a television show and/or a motion picture which may be broadcasted by cable television station and/or a television station. The subscriber 17 may purchase the digital media for viewing and/or displaying via the set-top box 28 and/or the display monitor 34. Further, the subscriber 17 may purchase the content, the digital media and/or the digital file to view and/or to display at one or more times via the set-top box 28 as illustrated in FIG. 1. Moreover, the subscriber 17 may purchase the digital media to view and/or to display via the set-top box 28 and may receive a digital video disc (hereinafter "DVD") of the digital media via a mail service.

The subscriber 17 may receive one or more credits to view and/or to display the content, the digital media and/or the digital file via the set-top box 28 and/or to receive the DVD of the content, the digital media and/or the digital file. One or more credits may be assigned to the subscriber 17 in a time period, such as, for example, a monthly pack, quarterly pack and/or an annual pack. One or more credits may be assigned to the subscriber 17 for an event, such as, for example, a timely payment of a bill relating a subscription to the network 10.

A digital ownership of the content, the digital media and/or the digital file may allow the subscriber 17 to build a digital library which may include a plurality of content, a plurality of digital media and/or a plurality of digital files which may be accessed and/or may be received via the network 10. However, the subscriber 17 may cancel subscription to the network 10 and may loss and/or may relinquish the digital library. The subscriber 17 may be able to access and/or to view the digital library from a set-top box 28 at another location besides the premises 16. The digital library may not be duplicated and/or may not be stored on another set-top box 28 at another location. The smart card and the set-top box 28 at another location may authenticate and/or may identify the subscriber 17 prior to accessing the digital library of the subscriber 17. The central office 12, one or more substations 14a-14f and/or the set-top box 28 may manage and/or may access the digital library for viewing via the display monitor 34. The network 10 may prohibit the subscriber from transmitting and/or from transferring the digital library to an outside computer via the ISP 24 and/or the VOIP 26 as illustrated in FIG. 1. If the digital media and/or the digital files of the digital library may be removed from the network 10, a hard copy, such as, for example, a DVD of the digital media and/or the digital file may be forwarded to the subscriber 17.

As illustrated in FIGS. 1 and 2, the network 10 may utilize the KVM switches 204a-204d over, for example, the ADSL network or the DSL network. For example, a single HDTV video feed may be continuous and/or may be compressed to, for example, 12-15 megabits per second. The ADSL network and/or the DSL network may be capable of transmitting 100 or more megabits per second. A bandwidth of a set-top for HDTV may be 20 megabits and/or for 10 megabits for DVD quality. The network 10 may have one or more substations 14a-14f as illustrated in FIG. 2. Each of the one or more substations 14a-14f may have the DSLAM 22 which may be capable of receiving and/or of transmitting 20 megabits or more. The VLAN switch 20 may split into, for example, a 1-5 megabit connection to the ISP 24 and a 15-19 megabit connection to the central office 12 via the communication medium 18.

Alternatively, if the communication medium 18 is not available, a satellite uplink 334 as illustrated in FIG. 3 and/or antennas 202a, 202b as illustrated in FIG. 2 may be utilized for connection to a central office 12. For example, substation 14a may serve 10,000 subscribers and/or may require connection having 150 gigabits of bandwidth between the central station 12 and the substation 14a via the communication medium 18 as illustrated in FIG. 1. A bandwidth between from the set-top box 28 to the substation 14a via the connector line 36 may transmit and/or may send less than 1 megabit of data from the set-top box 28 to the substation 14. The data may be, for example, a curser movement, a keyboard movement, an input device movement, an authentication data and/or or a security data. It should be understood that the number of substations of the network 10 may be any number of substations implemented by one having ordinary skill in the art. Moreover, it should be understood that the connection between the substations 14a-14f may be any communication medium implemented by one having ordinary skill in the art.

The VOIP network 26 may be connected to the substation 14a as illustrated in FIG. 1. The VOIP network 26 may provide, for example, a telephone link and/or a telephone service to the network 10. The substation 14a may provide the VOIP network 26 to the set-top box 28 of the subscriber 17 via the connection link 36. As a result, the network 10 may provide a telephone service to the set-top box 28 of the subscriber 17 via the VOIP network 26, the substation 14a and/or the connection link 36.

As illustrated in FIG. 1, the DSLAM 22 of the substation 14a may access, may transmit and/or may receive the content, the digital media, the digital file, the digital data signal, the digital video signal and/or the digital audio signal from the server farm 220 of the central office 12. A bandwidth of the DSLAM 22 may be dependent upon the distance between the set-top box 28 and the substation 14a. For example, the network 10 may require a bandwidth between 15 megabits per second and thirty megabits per second at a range of three kilometers between the set-top box 28 and the substation 14a. For the display monitor 34 to produce HDTV quality images, the network 10 may require the connection line 36 to have a bandwidth of at least fifteen megabits per second. For the display monitor 34 to produce DVD quality images, the network may require the connection line 36 to have a bandwidth of at least ten megabits per second. In a preferred embodiment, the connection line 36 may have a bandwidth of at least twenty megabits per second.

The VLAN switch 20 may connect the DSLAM 22 to the central office 12 and/or the ISP 24 as illustrated in FIG. 1. The VLAN switch 20 may be, for example, a 48 port, 100 megabit per second switch with a one gigabit uplink to the network backbone 208. The VLAN switch 20 may be capable to dissect a first network for broadband internet and a second network for the ISP 24 or the network backbone 208.

The communication medium 18 may connect the substation 14a to the central office 12 as illustrated in FIG. 1. The communication medium 18 may have a bandwidth which may receive and/or may transmit fifteen megabits per subscriber link connected to the substation 14a. For example, at peak usage, the communication medium 18 may have a usage in a range up to 85% to 90% usage which may require a thirteen gigabit connection between the central office 12 and the substation 14a per thousand subscribers.

As illustrated in FIG. 1, the central office 12 may be central to the network 10. The central office 12 may serve a region and/or a metropolitan area, such as, for example, Chicago, New York City, Atlanta and/or the like. The communication medium 18 from one or more of the substations 14a-14f may interface with one or more of the KVM switches 204a-204d as illustrated in FIG. 2. One or more of the KVM switches 204a-204d may compress the digital data signal, the digital audio signal, digital video signal, an input signal and/or an output signal from one or more node clusters 302a-302e. One or more of the KVM switches 204a-204d may transmit and/or may deliver the digital data signal, the digital video signal, the digital audio signal, the input signal and/or the output signal to a set-top box 28 via the network 10 and/or one or more of the substations 14a-14f. The KVM switches 204a-204d may be arranged in close proximity to one or more node clusters 302a-302l as illustrated in FIG. 2. One or more node clusters 302a-302e may be a customized workstation which may be rack mounted at the central office 12 or at one of the substations 14a-14f.

One or more node clusters 302a-302e may have an analog connector or a digital video interface (hereinafter "DVI") connector for connecting each of the node clusters 302a-302e with one of the KVM switches 204a-204d to display the digital video signal. Each of the KVM switches 204a-204d may have, for example, a standard PS/2 keyboard port, a mouse port and/or the like for connecting to the each of the node clusters 302a-302e. The digital audio signal may be transmitted from the each of the node clusters 302a-302e to one or more of the KVM switches 204a-204d via a digital audio cable. A universal serial bus (hereinafter "USB") connection or a standard serial port connection may connect one or more of the node clusters 302a-302e to one or more of the KVM switches 204a-204d to facilitate basic data communications. Each of the node clusters 302a-302e may have a central processing unit (hereinafter "CPU"), a memory, a power-supply and/or a system board. The system board may be similar to a consumer-level motherboard. Further, the system board may have a video connection port, a digital audio outport, a serial port, a USB port, a gigabit network adapter, a PS2 mouse port and/or a keyboard port. Alternately, each of the KVM switches 204a-204d may utilize the video port and/or the USB port of the system. The USB port may receive and/or may transmit the input signal, the output signal, the audio signal and/or a signal from another device, such as, for example, a digital camera, a digital video recorder and/or the like.

One or more of the KVM switches 204a-204d may be connected to, may be attached to and/or may be in communication with node clusters 206a-206l. Each of the node clusters 206a-206l may be connected to the server farm 220. The content, the digital media and/or the digital files may be stored within the server farm 220. As a result, each of the node clusters 302a-302e may be capable of accessing, may be capable of downloading and/or may be capable of transmitting the content, the digital media and/or the digital files from the server farm 220 to the set-top box 28.

A request for the content, the digital media and/or the digital file from the server 17 may be received by one of the substations 14a-14f from the set-top box 28 and/or connection line 36. One of the substations 14a-14f and/or one of the node clusters 206a-206l may located the content, the digital media and/or the digital file in the server farm 220. One of the substations 14a-14f may copy the content, the digital media and/or the digital file locally to one of the node clusters 302a-302e as illustrated in FIGS. 2 and 3. The content, the digital media and/or the digital file may be stored in and/or accessed from the content servers 332a-332f and/or the streaming video content servers of the server farm 220 by one of the node clusters 206a-206e as illustrated in FIG. 3.

One of the nodes clusters 206a-206e may transmit and/or may transfer the content, the digital media and/or the digital file to the set-top box 28 via one of the substations 14a-14f. The set-top box 28 may play, may store, may launch and/or may display the content, the digital media and/or the digital file. Transferring the content, the digital media and/or the digital file to the set-top box 28 via one of the node clusters 206a-206e may take, for example, in a range of several seconds to a minute or more to transfer depending on a length and/or a size of the content, the digital media and/or digital file. Each of the node clusters 206a-206f may access and/or may transfer the advertisement from one of the advertisement servers 330a-330c in the server farm 220 to the set-top box 28 via the network 10. Moreover, each of the one or more advertisements may be cached locally to each of the node clusters 206a-206e. The content, the digital media and/or the digital file may be queued and/or may be transferred while the advertisement may be displayed via the display monitor 34. Alternatively, the advertisement, the content, the digital media and/or the digital file may be streamed from the streaming video servers 328a-328c of the server farm 220 to the set-top box 28 via one of the node clusters 302a-302e and/or one of the substations 14a-14f.

The network 10 may distribute digital media and/or live content from the cable television station and/or the television station via a closed circuit television system or a broadcast of a live channel to the network 10. In the case of a closed circuit television system, live content feeds from the cable television station and/or the television station may be placed in the server farm 220 of the central office 12. A standard coaxial cable may be connected to a peripheral component interconnect (hereinafter "PCI") based TV tuner card in each of the node clusters 302a-302e. The closed circuit television system may be, for example, a legacy system. In the case of the broadcast of the live channel to the network 10, each of the node clusters 302a-302e may receive and/or may transfer the live channel from one of the streaming video content servers of the server farm 220 to the set-top box 28 via the networks 10, 300. As a result, a delay of a half second to one second may occur while changing between more than one live channel.

As illustrated in FIGS. 1-3, the network 10 may be connected to and/or may be attached to the network 200 and/or the network 300 of the server farm 220. A size of the server farm 220 may be proportional to an amount of subscribers and/or may not be proportional to an amount of the content, of the digital media and/or of the digital files stored within the server farm 220. For example, a single HDTV quality digital file with compression and digital audio signal may be five gigabytes or less in size. A one gigabit or more connection with moderate network usage may be required to transfer the single HDTV quality file with compression and digital audio signal from one of the content servers 332a-332f to one of the node clusters 206a-206l within forty seconds to fifty seconds. As set forth above, a ninty second advertisement spot from one of the advertisement content servers 330a-330c may be played and/or may be displayed on the display monitor 34. Further, for ten subscribers a minimum of eight to nine node clusters 206 may be required for the networks 10, 200.

As illustrated in FIG. 3, the network 300 of the server farm 220 may have the DNS server 310 for domain name resolution, the DHCP server 308 for IP assignment and/or the exchange messenger server for e-mail services and/or system messages to and from the subscriber 17. The network 300 may have the network management server 312 and/or the content database server 318 to manage the content, the digital media and/or the digital files of the content servers 332a-332f, the streaming video content servers 328a-328c and/or the advertisement content servers 330a-330c. The network 300 may have the GUI content management server 320 and/or the GUI content server to the GUI interface of the set-top box 28, the display monitor 34 and/or the handheld device 32.

The networks 10, 200, 300 may be a directory system which may utilize permissions and security to grant or to deny access to the content, the digital media and/or the digital files. The digital media, the digital file, the content, the subscriber 17, the node clusters 206a-206l may be an active directory integrated to streamline management and security of the networks 10, 200, 300. The domain controller 306 may manage, may access, may receive and/or may transmit the content, the digital media and/or the digital files. The active directory may have unlimited scalability and may manage an infinite amount of subscribers 17, computers, servers, content, digital media and/or digital files. Upgrades to and/or addition of hardware to the networks 10, 200, 300 may be available and/or may be installed without requiring disassembly of the networks 10, 200, 300. As illustrated in FIG. 2, the network 200 may distribute the digital media, the digital files and/or the content of the content servers 332a-332f, the streaming video content servers 328a-328c and/or the advertisement content servers 330a-330c in a packet form delivered via transmission control protocol/internet protocol (hereinafter "TCP/IP") from the one or more of the KVM switches 204a-204d to the one or more of the substations 14a-14f. Each of the substations 14a-14f may have the communication media 18 for connection to the central office 12. The communication media 18 may be coupled with high speed switches 210a-210c which may be set up in an array connecting to the KVM switches 204a-204d. The KVM management server 218, the set-top management server 216 and the network management server 214a may manage and/or may control the KVM switches 204a-204d, the set-top box 28 and infrastructures of the networks 200, 300, respectively Moreover, each of the node clusters 206a-206l may have between 32 nodes and 64 nodes therein. The communication media 18 may be a point to point connection from, for example, substations 14a, 14b to the central office 12 as illustrated in FIG. 2. Alternatively, the communication media 18 may be daisy-chained from the central office 12 to, for example, the substation 14a and/or to substation 14f. Yet another alternative, antennas 202a, 202b of the substations 14c, 14d, respectively, may be utilized to connect the substations 14c, 14d to the communication media 18 and/or the central office 12. As a result, the subscriber 17 of the network 10 may utilize a consistent fifteen megabit download stream. An upload stream from the substations 14a-14f and/or the set-top box 28 to the central office 12 may be negligible with respect to the download stream from the server farm 220 to one or more of the substations 14a-14f and/or the set-top box 28. The high-speed switches 210a-210c may provide connections to interconnect the KVM switches 204a-204d to the communication media 18. The high-speed switches 210a-210c may be interconnected to allow more than one subscriber 17 to connect to any node and/or to one of the node clusters 206a-206l of the central office 12.

The KVM switches 204a-204d may access, may receive, may transmit and/or may disseminate the content, the digital media, the digital file, the digital video signal, the digital audio signal, input signal and/or the output signal from each node and/or each of the node clusters 206a-206l into IP to be routed via the DSLAM 22 to the set-top box 28. The KVM switches 204a-204d may be designed similarly to network switches which may allow and/or may permit 32 to sixty-four concurrent subscribers 17 to be connected to a corresponding number of nodes and/or to one of the node clusters 206a-206l. For example, the KVM switches 204a-204d may have sixty-four DVI connectors and/or sixty-four USB connectors to attach to sixty-four nodes and/or one of the node clusters 206a-206l. As a result, 64 concurrent subscribers may access the networks 10, 200, 300. The USB connectors may be used to replace a serial port, the PS/2 mouse port and/or the keyboard port. Input functions, output functions and/or the digital audio signal may be transmitted and/or may be received via the USB connectors. The KVM switches 204a-204d may compress and/or may transmit the content, the digital media, the digital file, the digital video signal and/or the digital audio signal in a packet form via TCP/IP. The KVM switches 204a-204d may require a security arrangement prior to activation which may be authenticated via a lightweight director access protocol, the subscriber database 340 and/or the authentication server 212.

As illustrated in FIGS. 1-3, the central office 12, the substations 14a-14f, the networks 10, 200, 300 and/or the server farm 220 may be connected to and/or may communicate with the global headquarters (hereinafter "HQ") 336 via a satellite 334 and/or the central office uplink 338. The global HQ 336 may provide the content, the digital media and/or digital files to the server farm 220 and/or the central office 12 in an area and/or a region. The global HQ 336 may control, may manage and/or may direct more than one central office 12 in one than one area and/or more than one region. The global HQ 336 may have a data repository (not shown in the drawings) to store and/or to manage the content, the digital media and/or the digital files therein. New content, new digital media and/or new digital files may be uploaded to the data repository at the global HQ 336. The new content, the new digital media and/or the new digital files may be distributed to, may be transmitted to and/or may be accessed by at least one central office 12. The global HQ 336 may have a staff therein to direct management of at least one central office 12 which may utilize wide-area network (hereinafter "WAN"). The global HQ 336 may be designed to provide services to the subscriber 17 and/or additional subscribers of the central office 12 which may be disabled. The global HQ 336 may provide disaster recovery in an event that the central office 12 may be disabled due to a natural disaster and/or a man-made disaster. Alternatively, the global HQ 336 may communicate with the local office 12 via long haul fiber (not shown in the drawings).

The networks 10, 200, 300 may be closed networks which may increase security of the networks 10, 200, 300 and/or which may decrease pirating and/or may decrease stealing of the content, the digital media, the digital file, the digital video signals, the digital audio signals and/or data signals transmitted between the networks 10, 200, 300. The smart card of the subscriber 17 may provide a key to the network 10 for the subscriber 17. Without the smart card, the subscriber 17 may not be capable to gain access to the network 10 through the authentication server 212. An action and/or a request within the network 10 by the subscriber 17 may be logged, may be documented and/or may be tagged within the subscriber database 338 with the smart card. The smart cards may be a credit card which may allow the subscriber 17 to access the content, the digital media and/or the digital file of the network 10. The content, the digital media and/or the digital file may be cross-referenced with the smart card of the subscriber 17 to determine if the subscriber 17 may have access to the content, the digital media and/or the digital file.

The content, the digital media and/or the digital file may be accessed by the subscriber 17 which may be tracked, may be recorded and may be stored in the marketing database 344 to create a list of viewing habits of the subscriber 17. The list of the viewing habits of the subscriber 17 may be utilized by an advertiser (not shown in the drawings) and/or by a marketer (not shown in the drawings) to provide target advertising and/or target marketing, respectively, to the subscriber 17. Moreover, the subscriber 17 may not be capable of bypassing, forwarding past and/or stopping the advertisements delivered to the set-top box 28 by the network 10. The network 10 may be connected to and/or in communication with a computer (not shown in the drawings) on the premises 16 of the subscriber 17 for remote computing. The subscriber 17 may utilize the computer which may be managed by the network 10. The network 10 may provide the computer and/or the subscriber with software on demand, high-speed internet access, and a connection to a corporate network (not shown in the drawings) for working from the premises 16. Utilizing the GUI of the display monitor 34, of the handheld device 32 and/or the computer may allow the subscriber 17 to request, to access, to launch and/or to activate software which may be stored in the server farm 220 and/or the application server 322 of the networks 10, 200. The subscriber 17 may not be required to install software or to maintain the software on the computer as the software may be maintained by the network 10, the central office 12 and/or the global HQ 336. Moreover, the software may be launched from the GUI which may be provided by the GUI content management server 320 and/or the GUI content server 324 in the server farm 220.

The network 10 may provide a secure intranet and/or a centralized intranet for an entity, such as, for example, a corporation, a business, a non-profit organization, a government entity, an academic institution, a local municipality, a state agency and/or a federal agency which may required an outsourced staff. Functions of the staff may be performed by, may be managed by and/or may be organized by the network 10. For example, the academic institution may provide, for example, an educational program, a live video conference, an educational lesson, a tutorial, a lecture, a communication, a recorded seminar and/or the like to the subscriber 17 via the network 10. The present invention should not be deemed as limited to the embodiments of a specific entity.

The subscriber 17 may utilize the set-top box 28, the display monitor 34 and/or the handheld device 32 as a gaming counsel. The set-top box 28 may receive, may access and/or may display data relating to a video game. The data may be centralized with in the server farm 220, the central office 12 and/or the global HQ 336. As a result, software upgrades and/or loading of new video games may be launched and/or may be executed via the network 10 from the central office 12 and/or the global HQ 336. Advertisements from one or more of the advertisement content servers 330a-330c may be displayed within the video game and/or in previews prior to launching the video game. The video game may utilize a common programming language and game video conferencing may be established via the network 10 and/or the VOIP network 26 of the network 10. Moreover, the video game may be transmitted, may be received and/or may be displayed in HDTV by the subscriber 17 which may enable the subscriber 17 to utilize a widescreen television for gaming. The networks 10, 200, 300 may distribute the content, the digital media and/or the digital file to the subscriber from one or more substations 14a-14f via one or more node clusters 206a-206l. The subscriber 17 may utilize the handheld device 32 and/or the set-top box 28 to access, to request, to receive and/or to display the content, the digital media and/or the digital file. The central office 12 may be connected to one or more of the substations 14a-14f and/or may be connected to one or more node clusters 206a-206l. Each of the node clusters 206a-206l may send, may transmit and/or may receive the content, the digital media and/or the digital file from the server farm 220 of the central office 12. The content, the digital media and/or the digital file may be transmitted and/or distributed to the set-top box 28 of the subscriber 17 via a communication medium 18, the connection line 36 and/or one or more of the node clusters 206a-206l. Each of the node clusters 206a-206l may access and/or may be in communication with the server farm 220 of the central office 12 via the communication medium 18.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A network for managing and distributing digital media to a terminal of a user via internet protocol, and providing one or more data signals, video signals and audio signals to subscribers without utilizing all available bandwidths of a high-speed connection, the network comprising:

a central office having a first plurality of servers and a first keyboard video mouse switch wherein the first keyboard video mouse switch is connected to the first plurality of servers by a first node and further wherein the digital media is stored in the first plurality of servers; and a first substation having a first multiplexer wherein the first substation is remote with respect to the terminal and the central office and further wherein the first plurality of servers is in communication with the first multiplexer using the first node;

a first digital media file of the digital media wherein the first digital media file is transferred from the first plurality of servers to the first multiplexer of the first substation using the first node wherein the first multiplexer of the first substation transmits the first digital media file to the terminal of the user;

a second digital media file of the digital media stored in the first plurality of servers wherein the central office transmits the second digital media file from the first plurality of servers to the terminal of the user;

a second keyboard video mouse switch connected to the first plurality of servers wherein the second digital media file is transferred from the first plurality of servers to the terminal using the second keyboard video mouse switch and further wherein the second keyboard video mouse switch is a different switch than the first keyboard video mouse switch: and a smart card that authorizes the user to obtain the first digital media file and the second digital media file from the first plurality of servers at a first location and at a second location remote from the first location.

2. The network of claim 1 further comprising:
a broadband connection that connects the first multiplexer of the first substation to the terminal of the user wherein the first substation transmits the first digital media file and the second digital media file to the terminal using the broadband connection.

3. The network of claim 1 further comprising:
a wireless communication link between the first multiplexer of the first substation and the terminal wherein the first substation transmits the first digital media file and the second digital media file to the terminal using the wireless communication link.

4. The network of claim 1 further comprising:
a second substation having a second multiplexer wherein the second substation is remote with respect to the terminal, the first substation and the central office and further wherein the second digital media file is transferred to the terminal from the central office using the second multiplexer of the second substation.

5. The network of claim 1 further comprising:
a second node that is a different node than the first node wherein the second node connects the first plurality of servers to the first substation and further wherein the central office transmits the second digital media file from the first plurality of servers to the first multiplexer of the first substation using the second node.

6. The network of claim 1 further comprising:
a second plurality of servers authorizing the user to access the digital media.

7. A system for managing and distributing digital media to a user via an internet protocol, and providing one or more data signals, video signals and audio signals to subscribers without utilizing all available bandwidths of a high-speed connection, the system comprising:
a terminal having a graphical user interface and a display monitor wherein a first digital media file and a second digital media file are requested using the graphical user interface and further wherein the digital media is displayed via the display monitor;

a first network that has a plurality of servers in communication with a first keyboard video mouse switch wherein the first digital media file and the second digital media file are is stored in the plurality of servers;

a second network that has a plurality of substations connecting the terminal to the first network wherein the plurality of substations are remote with respect to the terminal and the plurality of servers;

a node that connects the second network to the first keyboard video mouse switch of the first network wherein the first digital media file is transferred from the first network to the second network using the node;

a connection line connecting the second network to the terminal wherein the first digital media file is transferred from the second network to the terminal via the connection line;

a second keyboard video mouse switch connected to the plurality of servers wherein the second digital media file is transferred from the plurality of servers to the terminal using the second keyboard video mouse switch, the second keyboard video mouse switch and the connection line and further wherein the second keyboard video mouse switch is a different switch than the first keyboard video mouse switch: and a smart card that authorizes the user to obtain the first digital media file and the second digital media file from the plurality of servers at a first location and at a second location remote from the first location.

8. The system of claim 7 further comprising:
an additional node wherein the second network communicates with the first network using the additional node.

9. The system of claim 7 further comprising:
a satellite link connecting the substation to the plurality of servers.

10. The system of claim 7 further comprising:
a third network that has an additional plurality of servers in communication with the second network wherein the additional plurality of servers stores a third digital media file and further wherein the third network transmits the third digital media file to the second network using an additional node in communication with the second network.

11. The system of claim 7 further comprising:
a satellite in communication with the first network wherein the satellite transmits the first digital media file to the first network.

12. The system of claim 7 further comprising:
a fiber optic link connecting the substation to the plurality of servers.

13. A method for managing and distributing digital media to a set-top box of a user wherein the set-top box has a graphical user interface, and providing one or more data signals, video signals and audio signals to subscribers without utilizing all available bandwidths of a high-speed connection, the method comprising the steps of:
providing a first network having a first substation, a second substation and a grid of servers wherein the first substation and the second substation are remote with respect to each other, the set-top box and the grid of servers and further wherein a first keyboard mouse switch connects the first substation and the second substation to a first node wherein a second keyboard video mouse switch connects the terminal to the second substation and further wherein the second keyboard video mouse switch is a different switch than the first keyboard video mouse switch wherein the digital media is stored in the grid of servers and further wherein the grid of servers stores a first digital media file and a second digital media file;

transferring the first digital media file from the grid of servers to the set-top box using the first node, the first keyboard mouse switch and the first substation;

transferring the second digital media file from the grid of servers to the set-top box using the second substation and the second keyboard video mouse switch; and authorizing the user to obtain the first digital media file and the second digital media file from the grid of servers at a first location and at a second location remote from the first location wherein authorization is based on a smart card used by the user.

14. The method of claim 13 further comprising the step of: communicating with the first substation from the second substation located remote from the first substation.

15. The method of claim 13 further comprising the step of:

transferring an advertisement from an advertising content server of the grid of servers to the set-top box wherein the set-top box displays the advertisement during transfer of the first media file from the grid of servers to the set-top box.

16. The method of claim 13 further comprising the step of: transferring the second digital media file to the second substation using the second keyboard mouse switch wherein the second keyboard mouse switch connects the first node to the second substation.

17. The method of claim 13 further comprising the step of: transferring the second digital media file to the second substation using a second node that is a different node than the first node wherein the second node connects the grid of servers to the second keyboard mouse switch.

18. The method of claim 13 further comprising the step of: transferring the first media file from a first server of the grid of servers and the second media file from a second server of the grid of servers wherein the first server and the second server are different servers.

* * * * *

UNITED STATES PATENT AND TRADEMARK OFFICE
CERTIFICATE OF CORRECTION

| | | |
|---|---|---|
| PATENT NO. | : 7,634,076 B2 | Page 1 of 1 |
| APPLICATION NO. | : 11/196612 | |
| DATED | : December 15, 2009 | |
| INVENTOR(S) | : Peter Lee et al. | |

It is certified that error appears in the above-identified patent and that said Letters Patent is hereby corrected as shown below:

In column 2, line 50, delete "digial" and insert -- digital --, therefor.

In column 5, line 24, after "line" insert -- . --.

In column 17, line 28, delete "ninty" and insert -- ninety --, therefor.

In column 18, line 9, after "respectively" insert -- . --.

In column 21, line 24, in claim 1, delete "switch:" and insert -- switch; --, therefor.

In column 22, line 4, in claim 7, after "are" delete "is".

In column 22, line 25, in claim 7, delete "switch:" and insert -- switch; --, therefor.

Signed and Sealed this
Fifteenth Day of November, 2011

David J. Kappos
*Director of the United States Patent and Trademark Office*